United States Patent [19]
Kiuchi et al.

[11] Patent Number: 5,050,101
[45] Date of Patent: Sep. 17, 1991

[54] PRINTING APPARATUS

[75] Inventors: Hiroyoshi Kiuchi, Hachiooji; Kazumi Dote, Fussa, both of Japan

[73] Assignee: Casio Computer Co., Ltd., Tokyo, Japan

[21] Appl. No.: 431,663

[22] Filed: Nov. 3, 1989

[30] Foreign Application Priority Data

Nov. 29, 1988 [JP] Japan .................................. 63-301921

[51] Int. Cl.$^5$ ............................................. G06K 15/00
[52] U.S. Cl. ...................................... 364/519; 400/68
[58] Field of Search ................ 364/519, 235 MS File, 364/930 MS File, 943 MS File, 943.3 MS File, 943.5 MS File, 225.6 MS File, 226 MS File, 226.1 MS File; 400/68, 63, 76

[56] References Cited

U.S. PATENT DOCUMENTS

| | | | |
|---|---|---|---|
| 3,822,378 | 7/1974 | Kashio | 364/519 |
| 4,003,031 | 1/1977 | Kashio | 364/519 |
| 4,031,515 | 6/1977 | Kashio | 364/519 |
| 4,032,900 | 6/1977 | Kashio | 364/519 |
| 4,034,350 | 7/1977 | Kashio | 364/519 |
| 4,064,553 | 12/1977 | Kashio | 364/519 |
| 4,079,234 | 3/1978 | Kashio | 364/519 |
| 4,103,334 | 7/1978 | Kashio | 364/519 |
| 4,133,041 | 1/1979 | Kashio | 364/519 |
| 4,145,753 | 3/1979 | Kashio | 364/519 |
| 4,944,614 | 7/1990 | Tanaka | 364/514 |

FOREIGN PATENT DOCUMENTS

| | | | |
|---|---|---|---|
| 53-46689 | 12/1978 | Japan | 364/519 |
| 57-51137 | 10/1982 | Japan | 364/519 |
| 57-56093 | 11/1982 | Japan | 364/519 |
| 58-46735 | 10/1983 | Japan | 364/519 |
| 58-53384 | 11/1983 | Japan | 364/519 |

Primary Examiner—Arthur G. Evans
Attorney, Agent, or Firm—Frishauf, Holtz, Goodman & Woodward

[57] ABSTRACT

Partial forms constituting parts of a slip or the like are stored in a printing apparatus side. A partial form corresponding to the type of data output from a computer is read out, and the data is overlaid with the partial form to be printed. One slip is formed by combining a plurality of partial forms. Therefore, a slip can be formed in accordance with the number and type of data, and data can be properly fitted in a form and printed. A large variety of types of forms can be printed in accordance with the type or the like of data to be printed.

4 Claims, 7 Drawing Sheets

PANTIAL FORM DESIGNATING INFORMATION

| | WORD No.1 | WORD No.2 | WORD No.3 |
|---|---|---|---|
| (M. | AMOUNT. | QUANTITY. | |
| (1. | TIME PIECE. | 360000. | 150. |
| (2. | WATCH. | 275000. | 105. |
| (3. | WATCH A. | 50000. | 50. |
| (3. | WATCH B. | 75000. | 25. |
| (3. | WATCH C. | 150000. | 30. |
| (2. | CLOCK. | 85000. | 45. |
| (3. | CLOCK A. | 20000. | 20. |
| | | | |
| (R. | | | |

FIG.2

| FORM TYPE | Y COORDINATES | X COORDINATES | | VERTICAL SIZE | HORIZONTAL SIZE | LINE TYPE | WORD No. | POSITION |
|---|---|---|---|---|---|---|---|---|
| S | Y2 | | | | | | | |

| | FORM TYPE | Y COORD | X COORD | | VERT SIZE | HORIZ SIZE | LINE TYPE | WORD No. | POSITION |
|---|---|---|---|---|---|---|---|---|---|
| a { | M | Y1 | X4 | m | l4 | 3030 | 1 | (x,y) | |
| | / | Y1 | X5 | m | l5 | 3033 | 2 | (x,y) | |
| b { | 1 | 0 | X1 | m | l1 | 1010 | 1 | (x,y) | |
| | / | 0 | X4 | m | l4 | 1030 | 2 | (x,y) | |
| | / | 0 | X5 | m | l5 | 1031 | 3 | (x,y) | |
| c { | 2 | 0 | X1 | m | 0 | 0010 | | | |
| | / | 0 | X2 | m | l2 | 2020 | 1 | (x,y) | |
| | / | 0 | X4 | m | l4 | 2030 | 2 | (x,y) | |
| | / | 0 | X5 | m | l5 | 2031 | 3 | (x,y) | |
| d { | 3 | 0 | X1 | m | l6 | 0012 | | | |
| | / | 0 | X3 | m | l3 | 3030 | 1 | (x,y) | |
| | / | 0 | X4 | m | l4 | 3030 | 2 | (x,y) | |
| | / | 0 | X5 | m | l5 | 3031 | 3 | (x,y) | |
| e | R | 0 | X1 | m | l7 | 1000 | | | |

PRINTING APPARATUS

BACKGROUND OF THE INVENTION

1. Field of the Invention

The present invention relates to a printing apparatus for printing data so as to be overlaid with the form of a slip or the like.

2. Description of the Related Art

When data output from a computer is to be printed together with the form of a slip or the like, printing is generally performed in the following manner. The form (constituted by vertical and horizontal ruled lines in accordance with a predetermined slip) of a slip to be output is stored. Data is output from the computer in accordance with the positions of the respective columns of the slip. In a printing section, the data output from the computer and the stored form of the slip are combined with each other and printed.

In this case, for example, three columns, namely "ITEM", "AMOUNT", and "QUANTITY" are formed along the first horizontal line of the form of the slip, and are respectively constituted by 10 lines in the vertical direction. The computer outputs data constituted by records each consisting of three words in accordance with the three columns, i.e., "ITEM", "AMOUNT", and "QUANTITY". The number of records to be output from the computer is arbitrarily set in accordance with the number of processed records. However, the form of a slip is designed such that records corresponding to ten lines are printed on one slip. Therefore, a set of records often cannot be properly fitted in the form of one slip depending on the number of records output from the computer. For this reason, an unnecessary blank is formed. As a result, the printed data becomes difficult to read, and consumption of recording paper is increased.

In addition, the form of a slip or the like described above is fixed, and hence data cannot be printed while changing the form of a slip in accordance with the type or the like of data to be printed. This prevents easy reading of printed data. Moreover, various types of forms cannot be printed in accordance with the types and the like of data to be printed.

SUMMARY OF THE INVENTION

It is an object of the present invention to provide a printing apparatus which can print data so as to be fitted in a form and can print various types of forms in accordance with the type or the like of data.

In order to achieve the above object, according to the present invention, a printing apparatus comprises: storage means for storing form information and a reference output position thereof in accordance with a form type representing a type of form; control means for receiving print data and a form type corresponding thereto and reading out form information from said storage means in accordance with the received form type; update means for updating the reference output position every time the readout from information is output upon addition thereof to the print data; and means for printing the print data to which the form information is added at the updated position.

According to the present invention, since printing can always be performed such that data and a form correspond to each other regardless of the number of data output from a computer, no blank line is formed in a form, and data can be printed so as to properly fitted in a form. Therefore, the printing apparatus of the present invention can print data which is easy to read, and is advantageous in terms of consumption of recording paper. In addition, since printing can be performed while a form is changed in accordance with the type or the like of data, printed data becomes easier to read. Moreover, various types of forms can be printed in accordance with the type or the like of data to be printed.

BRIEF DESCRIPTION OF THE DRAWINGS

FIG. 2 is a view showing an arrangement of a record data output from an apparatus main body;

FIG. 3 is a view showing form information set in a form memory 16;

DETAILED DESCRIPTION OF THE PREFERRED EMBODIMENTS

An embodiment of the present invention will be described below with reference to FIGS. 1 through 6.

Figure 1:
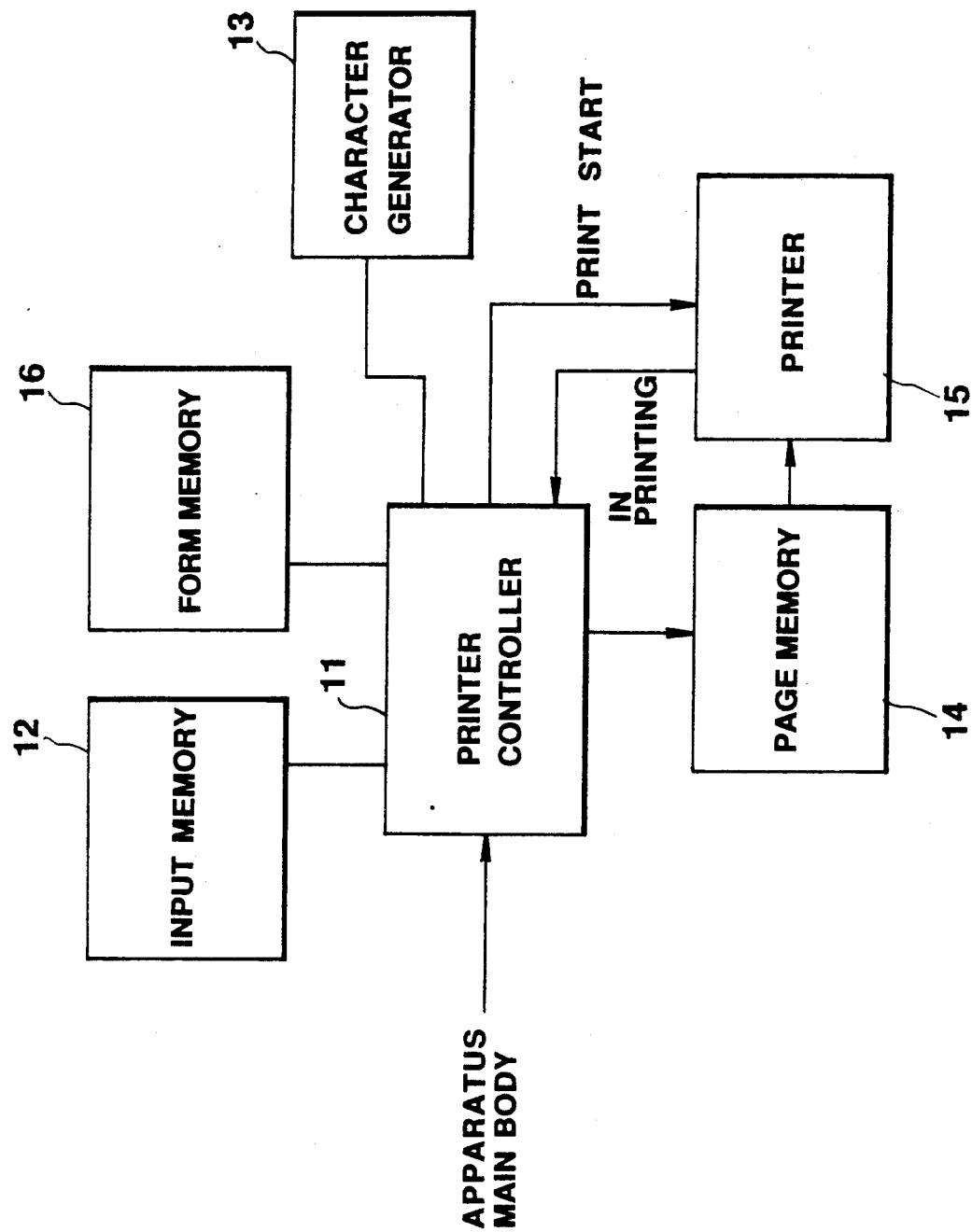
FIG. 1 is a block diagram showing an arrangement of a printing apparatus.

FIG. 1 shows an arrangement of a printing apparatus connected to an apparatus main body such as an office computer.

A printer controller 11 controls various types of printing in accordance with various prestored print processing programs. Upon reception of a print command from the apparatus main body (not shown), the printer controller 11 performs print control in accordance with a slip output program, thereby executing slip output processing by means of form overlay printing.

In addition, the printer controller 11 fetches data supplied from the apparatus main body and stores the data in input memory 12. Thereafter, the controller 11 reads the data from the input memory 12, converts it into a dot pattern for printing by using a character generator 13, and writes the dot pattern in a page memory 14. In this case, the controller 11 writes the data in the page memory 14, provided that no "in printing" signal is output from a printer 15.

The printer 15 is constituted by a thermal printer, a liquid crystal printer, or the like. In response to a print start signal from the printer controller 11, the printer 15 prints out the contents of the page memory 14.

A form memory 16 is arranged in the printing apparatus of this embodiment. The form memory 16 is designed to store a plurality of types of partial form information of the portions constituting a slip form. The contents of information to be stored are arbitrarily set in advance by a user or the like at the time of system designing. In slip output processing, upon receiving form designating information for designating a specific partial form to be used in accordance with data supplied from the apparatus main body, the printer controller 11 reads out the corresponding partial form information from the form memory 16. The controller 11 converts the information into a form pattern by using the character generator 13 and writes it in the page memory 14. In this case, the partial form and corresponding data are combined with each other in the page memory 14.

FIG. 2 shows a detailed arrangement of slip data output from the apparatus main body. Each record data constituting the slip data is arranged as follows.

In each record data, a delimiter code "(" representing a record start, partial form designation information "M", "1", "2", "3", or "R", and a word delimiter code "o" are arranged from the start of the record in this order, and subsequent word data are delimited by word delimiter codes "o". The partial form designating information "M" designates a partial form for a title. The partial form designating information "1", "2", and "3" respectively represent record types and designate partial forms corresponding to the record types. The partial form designating information "R" designates a partial form for designating a new page. In the data shown in FIG. 2, the partial form designating information "3" represents a record comprised of subtotal data based on watches A, watches B, watches C, or the like; the information "2", a record comprised of total data of watches or the like based on the sum of subtotal data of the watches A through C or the like; and the information "1", a record comprised of total sum data based on the sum of total data of the watches, clocks, and the like.

FIG. 3 shows an arrangement of form information in the form memory 16. The memory 16 stores a title form corresponding to the partial form designating information "M", data forms b, c, and d respectively corresponding to the partial form designating information "1", "2", and "3", and a new page form e corresponding to the partial form designating information "R". Note that the memory 16 stores the position of the print start line of the first record in one page corresponding to a partial form designating information "S".

In this case, each form information is constituted by Y and X coordinates representing the output start point position of a form, a vertical size representing a length from this start point position in the vertical direction (Y-axis direction), a horizontal size representing a length from this start point position in the horizontal direction (X-axis direction), and a line type for forming the form. Note that a line type is comprised of four digits. The first through fourth digits respectively correspond to upper, lower, left, and right line segments of a square form and designate line types of the corresponding line segments. In this case, line types "1", "2", and "3" respectively designate thick, intermediate, and thin lines, and a line type "0" designates the absence of a line. In addition, a word No. corresponding to this form and its print position are designated.

Figure 4A:
FIGS. 4A through 4D are views respectively showing partial forms to be printed in accordance with a form type.

FIGS. 4A through 4D respectively show partial forms to be printed in accordance with form types when a user or the like arbitrarily sets the form information shown in FIG. 3 in the form memory 16. FIG. 4A corresponds to the title form a; and FIGS. 4B through 4D, the data forms b, c, and d, respectively. In the form information shown in FIG. 3, all the vertical sizes are set to be one-line size, and hence all the partial forms are one-line size.

An operation of this embodiment will be described below.

Figure 5A:
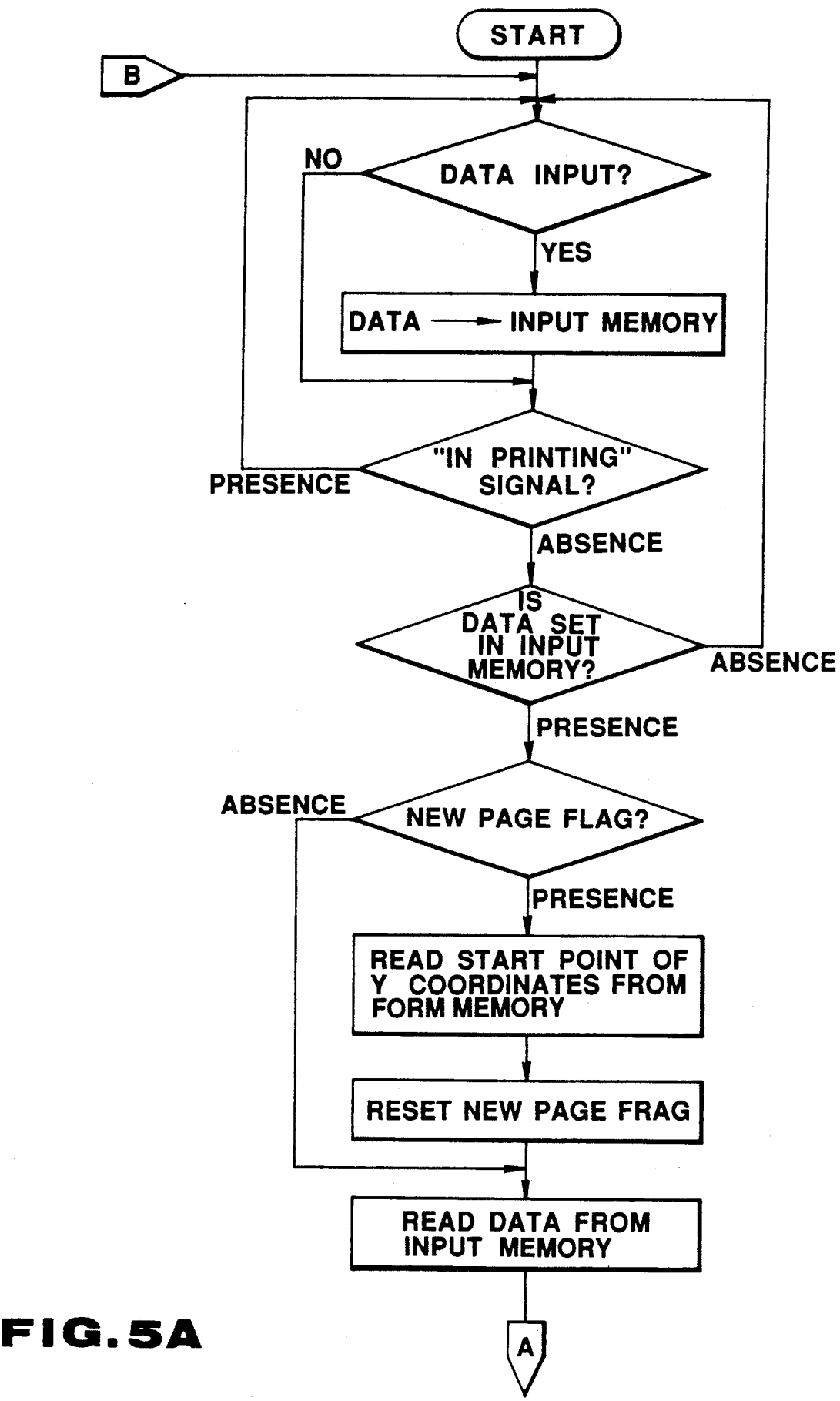
FIGS. 5A and 5B are flow charts for explaining an operation of a slip output mode.
Figure 5B:
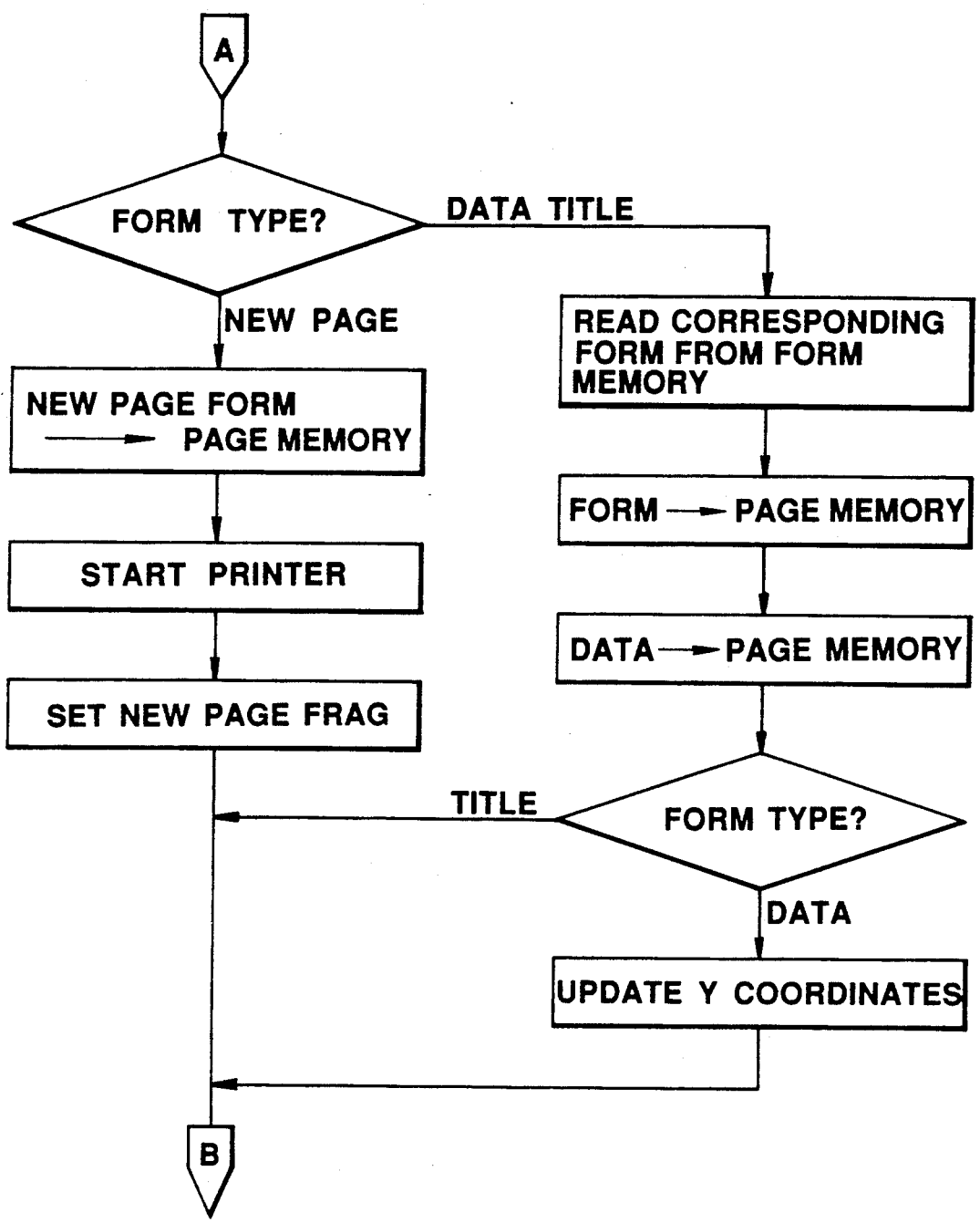

Upon reception of a print command from the apparatus main body, the printer controller 11 starts the slip output program and executes an operation in accordance with a flow chart shown in FIG. 5.

Assume that record data similar to the one shown in FIG. 2 is sequentially output from the apparatus main body.

When first record data is input to the printer controller 11, input of the data is detected in step S1, and the flow advances to step S2. As a result, the input record data is set in the input memory 12. The printer controller 11 checks the presence/absence of an "in printing" signal (step S3). If an "in printing" signal is present, the flow returns to step S1. If no "in printing" signal is present, the flow advances to step S4 to check whether data is set in the input memory 12. If the first record data is set in the input memory 12, it is checked whether a new page flag is set in the printer controller 11 (step S5). In this case, since the new page flag is set when one-page printing is completed or when the power is turned on in an initial state, the presence of a new page flag is detected at first, and the flow advances to step S6 to read out Y coordinate "$Y_2$" corresponding to a partial form designating information "S" from the form memory 16. The new page flag is then reset (step S7).

Subsequently, one-record data is read out from the input memory 12 (step S8), and form designating information included in the record data is referred to and a form type is discriminated (step S9).

Since the form type of the first record is for a title, the flow advances to step S13 to sequentially read out form information corresponding to the form type from the form memory 16. A form pattern for the title as shown in FIG. 4A is formed on the basis of the form information and is developed on the page memory 14.

More specifically, as shown in FIG. 3, of the form information of the form type "M", form information of a word represented by a word No. "1" (i.e., the first data word "AMOUNT" of the record data) comprised of Y coordinate "$Y_1$", X coordinate "$X_4$", a vertical size "m", a horizontal size "$l_4$", and a line type "3030". Therefore, an upper horizontal line is drawn from a position ($Y_1,X_4$) as a start point with a thin line by a horizontal size "1", and a left vertical line is drawn with a thin line by a vertical size "$m_4$", thus forming a form pattern. The form information of a word (the second data of the record data as the word "QUANTITY") represented by a word No. "2" comprised of Y coordinate "$Y_1$", X coordinate "$X_5$", a vertical size "m", a horizontal size "$l_5$", and a line type "3033". Therefore, an upper horizontal line is drawn from a position ($Y_1,X_5$) as a start point with a thin line by the horizontal size "$l_5$", and a left vertical line is drawn with a thin line by a vertical size "m". In addition, a right vertical line is drawn with a thin line by a vertical size "m". With this operation, a form pattern based on the form information is formed.

Each word data of the record read out from the input memory 12 is converted into a print pattern and is developed at a predetermined position on the page memory 14. At this time, each word data is developed at a print position (x,y) set in the page memory 14 in accordance with each word (step S15).

As a result, the title partial form and the respective word data of the title label are combined in the page memory 14.

The form type of this record is discriminated in step S16 in the same manner as in step S9. In this case, since the form type is for a title, the flow returns to step S1.

When second record data is input from the apparatus main body, the record data is set in the input memory 12 (step S2). In this case, since the absence of a new page flag is detected in step S5, the flow advances to step S8 to read out the record data from the input memory 12. Thereafter, the form type of the record data is discriminated (step S9).

Figure 4B:
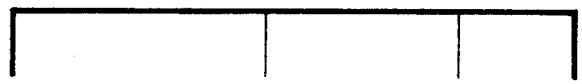

Since the form type of the second record is for data, the flow advances to step S13. In this case, the form designating information of the second record is "1", and hence data form information corresponding to the form type "1" is read out from the form memory 16. A data form pattern (1) shown in FIG. 4B is formed on the basis of this form information and is developed on the page memory 14 (step S14).

More specifically, of the form information corresponding to the form type "1", a word form pattern represented by the word No. "1" is formed first. In this case, the form pattern of the word No. "1" is formed by drawing an upper horizontal line with a thick line by a horizontal size "$l_1$" and a left vertical line with a thick line by a vertical size "m". A form pattern of the word No. "2" is formed by drawing an upper horizontal line with a thick line by a horizontal size "$l_4$" and a left vertical line with a thin line by a vertical size "m". In addition, a form pattern of a word No. "3" is formed by drawing an upper horizontal line with a thick line by a horizontal size "$l_5$", a left vertical line with a thin line by a vertical size "m", and a right vertical line with a thick line by a vertical size "m".

Each word data of the second record data read out from the input memory 12 is developed at a predetermined position on the page memory 14, so that the data form represented by the word type "1" and the respective word data are combined in the page memory 14.

Subsequently, the flow advances to step S16. In this case, since the form type is for data, the flow advances to step S17 to update the Y coordinates. More specifically, a vertical size "m" is added to an initial value "$Y_2$" of the Y coordinates set in the form memory 16. Thereafter, the flow returns to step S1.

Figure 4C:
Figure 4D:
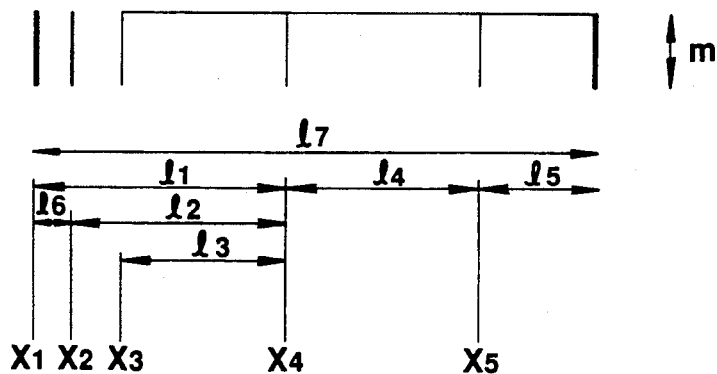

When third record data is input from the apparatus main body, the data is set in the input memory 12 (step S2). Similarly, in this case, the absence of a new page flag is detected in step S5. Since the form type is detected to be for data in step S9, steps S13 through S15 are executed. In this case, the form designating information of the third record is "2", and hence data form information corresponding to the form type "2" is read out from the form memory 16. A data form pattern (2) shown in FIG. 4C is formed on the basis of the data form information and is developed on the page memory 14 (steps S13 and S14). Subsequently, this data form and each data of the third record are combined in the page memory 14 (step S15). Similarly, in this case, the Y coordinates are updated, and the flow returns to step S1.

Since all the data of a fourth record and the subsequent records have form types for data, the above-described operation is repeated every time the record data is input (steps S13 through S17).

When the last record is input, since its form type is for a new page, a new page form is detected in step S9, and the flow advances to step S10. In step S10, form information for a new page is read out from the form memory 16, and a new page form pattern is formed on the basis of the form information to be developed on the page memory 14. Note that this new page form pattern is formed by drawing an upper horizontal line with a thick line by a horizontal size "$l_7$".

When one-page data is stored in the page memory 14 together with its form, a print start signal is supplied to the printer 15 to start the printer 15 (step S11). A new page flag is set (step S12), and the flow then returns to step S1. In this case, an "in printing" signal is input from the printer 15 to the printer controller 11. Therefore, if data of a second page is input, the data is set in the input memory 12, and the controller 11 stands by (steps S1 through S3).

Figure 6:
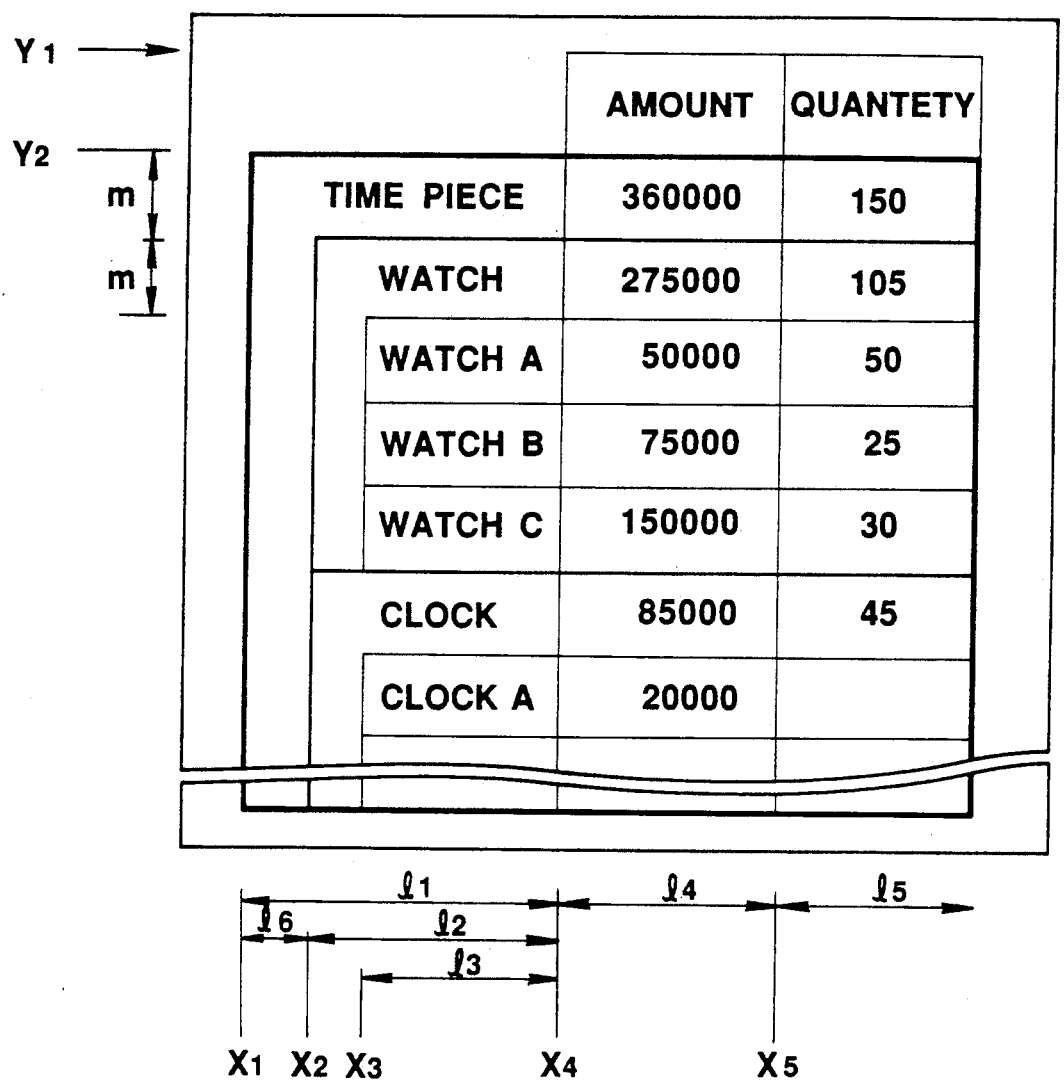
FIG. 6 is a view showing a printed slip.

FIG. 6 shows an input slip of one page. In this case, since partial forms are printed out in accordance with the number of records of a slip, record data and its partial form can always be set in a one-to-one correspondence regardless of the number of record data.

In the above embodiment, the print positions of data are stored in the form memory 16 in addition to form information. However, fixed data such as titles may be additionally stored in the form memory 16 or other memories.

Furthermore, in the above embodiment, one-record data corresponds to one-line partial form. However, any combinations can be employed. For example, a plurality of records may correspond to a predetermined partial form, and one word or a plurality of words may correspond to a predetermined partial form.

In the above embodiment, information of a new page is also supplied to the apparatus main body. However, a new page may be automatically controlled by the printing apparatus side. More specifically, a function for detecting an amount of data which can be printed in one page is arranged in the printing apparatus side so as to automatically read out a new page form. Moreover, in the above embodiment, a page printer is exemplified. However, the present invention can be equally applied to other printers such as a line printer for printing data in units of lines.

We claim:

1. A printing apparatus, comprising:
   storage means for storing partial form information, a reference output position of said partial form information, and item data of print data to be arranged in the form information, in accordance with each form type representing each type of partial form;
   control means for receiving print data and information designating a partial form type corresponding thereto, and for reading out partial form information from said storage means in accordance with a received partial form type;
   means for adding print data corresponding to the item data to the readout partial form information and for outputting the added print data and the partial form information;
   update means for updating the reference output position every time the added print data and the partial form information is output; and
   means for printing the print data to which the partial form information is added at the updated reference output position.

2. An apparatus according to claim 1, wherein each partial form information stored in said storage means comprises partial form information corresponding to one-record print data, said control means reading out partial form information corresponding to a form type of a received one-record print data, and
   said update means updates a reference output position thereof by an amount corresponding to a vertical size of one record.

3. An apparatus according to claim 1, wherein said storage means stores partial form information for a title form and a new page form, and said control means reads out each partial form information such that the title form information is set at a title position of one page and the new page form information is set at a new page position of one page.

4. A printing apparatus, comprising:

form storage means for storing a partial form adapted to constituting a part of a slip;

control means for receiving data and partial form designating information corresponding to the received data from an apparatus main body, and for reading out a corresponding partial form from said form storage means on the basis of the received partial form designating information;

means for printing a readout partial form and its corresponding data received from said apparatus main body, such that the data received from said apparatus main body is printed and overlayed on a partial form corresponding thereto; and means for associating a plurality of partial forms and respective associated received data with each other to constitute an overall form of a slip, and wherein said printing means prints said overall form of a slip.

* * * * *